(12) United States Patent
Swoboda

(10) Patent No.: US 7,603,589 B2
(45) Date of Patent: Oct. 13, 2009

(54) METHOD AND SYSTEM FOR DEBUGGING A SOFTWARE PROGRAM

(75) Inventor: Gary L. Swoboda, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 421 days.

(21) Appl. No.: 11/383,370

(22) Filed: May 15, 2006

(65) Prior Publication Data

US 2006/0259822 A1 Nov. 16, 2006

Related U.S. Application Data

(60) Provisional application No. 60/681,427, filed on May 16, 2005, provisional application No. 60/681,543, filed on May 16, 2005.

(51) Int. Cl.
*G06F 11/00* (2006.01)
(52) U.S. Cl. .................................................. 714/45
(58) Field of Classification Search ............. 714/25–27, 714/30–33, 37–39, 45, 46
See application file for complete search history.

(56) References Cited

U.S. PATENT DOCUMENTS

| | | | | |
|---|---|---|---|---|
| 5,058,114 A | * | 10/1991 | Kuboki et al. | 714/38 |
| 5,124,909 A | * | 6/1992 | Blakely et al. | 709/203 |
| 5,809,293 A | * | 9/1998 | Bridges et al. | 712/227 |
| 6,026,503 A | * | 2/2000 | Gutgold et al. | 714/45 |
| 6,308,311 B1 | * | 10/2001 | Carmichael et al. | 716/16 |
| 6,370,660 B1 | * | 4/2002 | Mann | 714/38 |
| 6,594,782 B1 | * | 7/2003 | Tagawa | 714/30 |
| 7,519,497 B2 | * | 4/2009 | Swoboda | 702/123 |
| 2004/0003209 A1 | * | 1/2004 | Mitsuishi et al. | 712/225 |
| 2004/0039835 A1 | * | 2/2004 | Glenn et al. | 709/231 |
| 2004/0103397 A1 | * | 5/2004 | Agarwala et al. | 717/128 |
| 2004/0133388 A1 | * | 7/2004 | Swoboda | 702/177 |

* cited by examiner

*Primary Examiner*—Nadeem Iqbal
(74) *Attorney, Agent, or Firm*—Robert D. Marshall, Jr.; Wade J. Brady, III; Frederick J. Telecky, Jr.

(57) ABSTRACT

A profiling system. At least some of the illustrative embodiments are integrated circuit devices comprising a processing circuit configured to execute a target program (the processing circuit having a plurality of registers), a trace system operatively coupled to the processing circuit (the trace system configured to collect trace data comprising the values of the plurality of registers, and the trace system configured to send the trace data for use by a debug program), a first memory operatively coupled to the processing circuit (the first memory comprising instructions to be executed by the processing circuit), and a memory location operatively coupled to the trace system (the memory location writable by the target program). The trace system is configured to send a value stored in the memory location to the host computer only when the value is newly written.

17 Claims, 2 Drawing Sheets

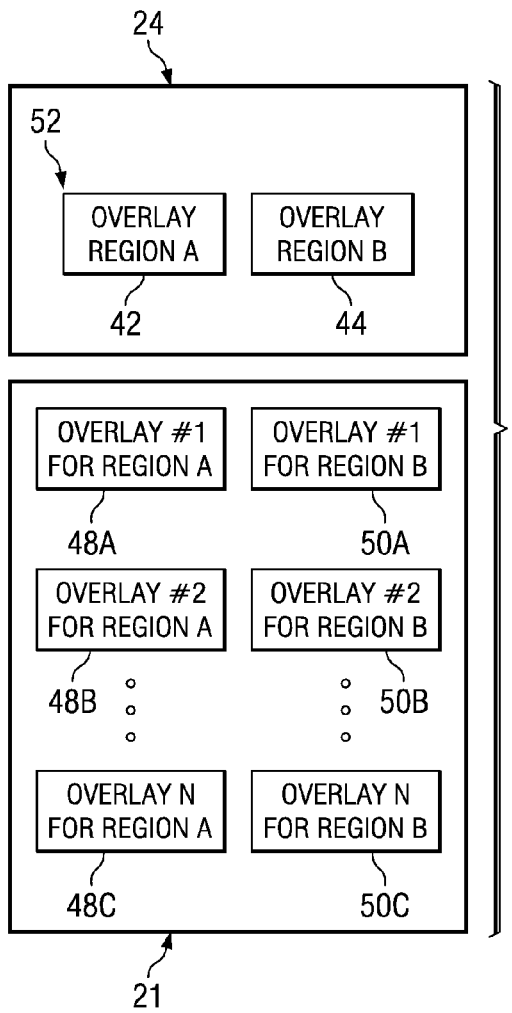
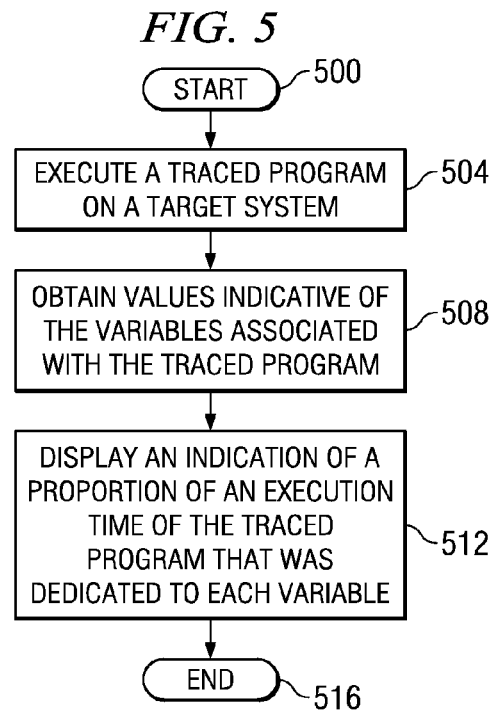# 
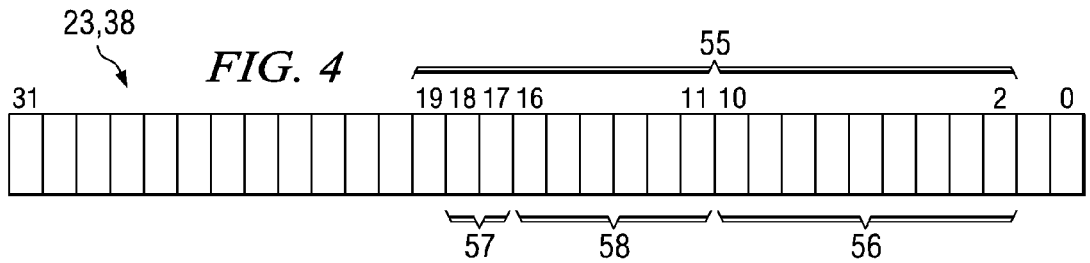

METHOD AND SYSTEM FOR DEBUGGING A SOFTWARE PROGRAM

CROSS-REFERENCE TO RELATED APPLICATIONS

This application claims the benefit of Provisional Application Ser. No. 60/681,427 filed May 16, 2005, entitled "Debugging software-controlled cache coherence," and Provisional Application Ser. No. 60/681,543 filed May 16, 2005, entitled "Real-time monitoring and profiling system events", both of which are incorporated by reference herein as if reproduced in full below.

BACKGROUND

In order to look for errors in software programs (an activity referred to as "debugging"), some software development tools provide the ability to record the sequence of operations that a processor performed while executing a program. This is referred to as tracing the execution of the program, and the information that is captured is referred to as trace data. The trace data may comprise data such as values in various processor registers during execution of a traced program, and the addresses of instructions the processor performed while executing a traced program.

However, some traced programs use overlays. Overlays are sequences of code and/or data bytes that are stored in slower (and thus less expensive) memory and are linked to run at a common address range in faster (and thus more expensive) memory, called an 'overlay region'. When a program determines that it needs access to the content associated with an overlay, the program copies the overlay into the faster memory so that it aligns with the addresses at which the overlay was lined to run. Overlays are used in time-critical applications where deterministic operation of the program is required, deterministic in this case refers to the ability of the programmer to determine ahead of time the worst-case path through a program, how much time it will take to execute that path, and thus to determine the longest amount of time to execute the code. The hardware cache systems found in modern processors are often unsuitable for these types of applications because they are inherently non-deterministic: interrupts, task switches or other events that occur during the execution of a program evict various address regions from cache, causing them to execute more slowly the next time they are accessed.

In systems using overlays, over time a plurality of overlay programs may execute from the same series of addresses. For a trace-debug program looking only at the sequence of addresses executed by the processor, it is difficult to determine which overlay was executed. Moreover, in software programs where multiple tasks are performed substantially simultaneously, and where those tasks communicate with and rely on each other to perform the overall task of the software program, one or more of the tasks may consume excessive processor time and slow overall system performance. However, when debugging the software program it is difficult to determine which of the many tasks consume excessive processor time.

SUMMARY

The problems noted above are solved in large part by a profiling system. At least some of the illustrative embodiments are integrated circuit devices comprising a processing circuit configured to execute a target program (the processing circuit having a plurality of registers), a trace system operatively coupled to the processing circuit (the trace system configured to collect trace data comprising the values of the plurality of registers, and the trace system configured to send the trace data for use by a debug program), a first memory operatively coupled to the processing circuit (the first memory comprising instructions to be executed by the processing circuit), and a memory location operatively coupled to the trace system (the memory location writable by the target program). The trace system is configured to send a value stored in the memory location to the host computer only when the value is newly written.

Other illustrative embodiments are integrated circuit devices comprising a processing circuit configured to execute a target program (the processing circuit having a plurality of registers comprising a program counter register that stores the address of the next instruction to be executed), and a system where a value is continually read (the system configured to output a default value or a preemptive value in place of the default value upon notification of posting of a new preemptive value).

Yet still other illustrative embodiments are systems comprising a host computer configured to execute a debug program, and a target system electrically coupled to the host computer (wherein the target system comprises a processing circuit, a trace system operatively coupled to the processing circuit, and a memory location operatively coupled to the trace circuit). The processing circuit is configured to execute a target program (wherein the processing circuit comprises a plurality of registers). The trace system is configured to collect trace data comprising values of the plurality of registers (wherein the trace system is configured to send the trace data to the host computer for use by the debug program). The memory location is writable by the target program. The trace circuit is configured to send a value stored in the memory location to the host computer only when the value is newly written.

BRIEF DESCRIPTION OF THE DRAWINGS

For a detailed description of exemplary embodiments of the invention, reference will now be made to the accompanying drawings in which:

FIG. 3 conceptually shows the relationship between overlay regions and overlay programs;

FIG. 4 shows a target state register in accordance with at least some embodiments;

FIG. 5 shows a method in accordance with embodiments of the invention.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
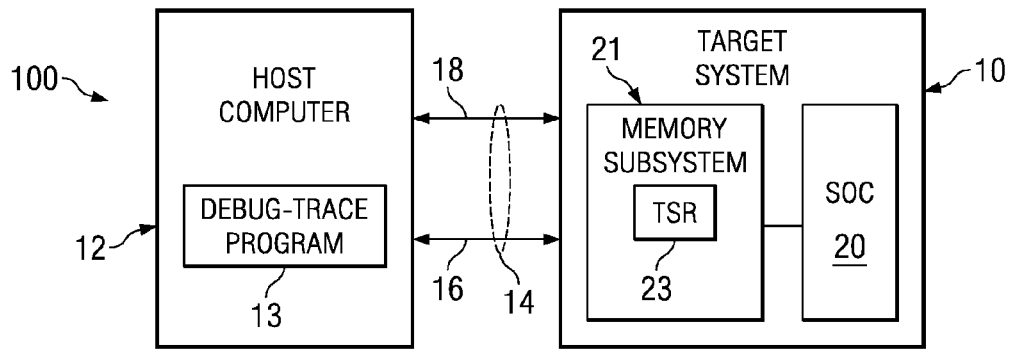
FIG. 1 shows a system in accordance with embodiments of the invention.

FIG. 1 illustrates a software development system 100 in accordance with embodiments of the invention. The software development system 100 comprises a target system 10 coupled to a host computer 12. The target system 10 may be any processor-based system upon which a software programmer would like to test and/or debug a computer program. The target system 10 may be, for example, a cellular telephone, a BLACKBERRY® device, or a computer system. The host computer 12 stores and executes a program that is used to debug, and in some cases gather trace data and produce trace data displays, and thus is referred to herein as a debug-trace program 13.

The host computer 12 and target system 10 couple by way of one or more interconnects 14, such as cables. In some embodiments, the host computer 12 couples to target system 10 by way of a multi-pin cable 16, such as a Mictor cable available from Tektronix Texas, LLC of Richardson, Tex. The multi-pin cable 16 enables transfer of trace data files from the target system 10 to the host computer 12. In alternative embodiments, the host computer 12 couples to the target system 10 by way of a serial cable 18 across which the host computer 12 communicates with the joint test action group (JTAG) communication system, or other currently existing or after developed serial communication system. Serial communication between the host computer 12 and target system 10 on serial cable 18 has lower bandwidth than a multi-pin connection through illustrative cable 16. Thus, in embodiments that rely exclusively on the JTAG-based communications over serial cable 18, rather than trace or capture every event of a processor within a particular time frame, a statistical sampling subsystem (discussed more fully below) of the target system 10 is configured to statistically sample pertinent data, and transfer the statistically sampled data across the serial cable 18. In yet still further alternative embodiments, the multi-pin cable 16 may have two or more pins dedicated to serial communication, and thus the host computer 12 and target system 10 may communicate using multiple protocols, yet over the same multi-pin cable 16.

Figure 2:
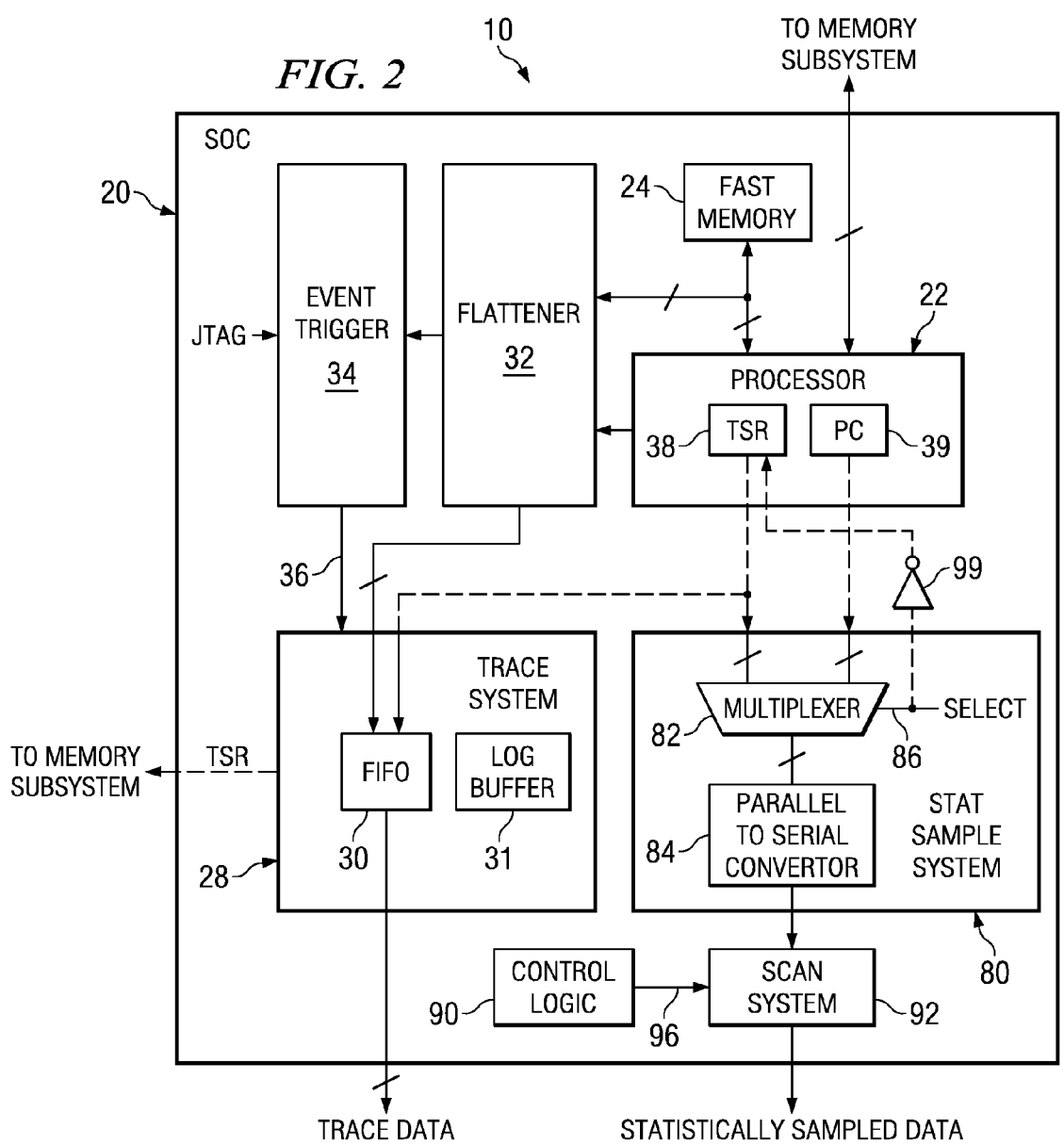
FIG. 2 shows an integrated circuit device in accordance with embodiments of the invention.

FIG. 2 shows in greater detail a portion of the target system 10. In particular, a target system 10 in accordance with at least some embodiments comprises a System-On-A-Chip (SOC) 20. The SOC 20 is so named because many devices that were previously individual components are integrated on a single integrated circuit. For example, the SOC 20 may comprise one or more processors 22, fast memory 24, and other devices (e.g., memory controllers, and specialty processors such as digital signal processors). In accordance with some embodiments, the SOC 20 also comprises a trace system 28. The trace system 28 comprises a First In-First Out (FIFO) buffer 30 in which trace data is gathered. In some exemplary embodiments, the trace data is sent to the host computer 12 (FIG. 1) by the trace system 28. Because the processor 22 may perform a plurality of parallel operations, in some embodiments the SOC 20 may also comprise a data flattener circuit 32. As the name implies, the data flattener circuit 32 gathers the pertinent trace data from the processor's execution pipeline, serializes or "flattens" the trace data so that events that execute at different stages in the pipeline are logged in the correct sequence, and forwards the trace data to the FIFO buffer 30 in the trace system 28. A non-limiting list of the various data points the data flattener circuit 32 may read, serialize and then provide to the FIFO buffer 30 is: direct memory access (DMA) trace data; fast memory trace data; addresses of instructions executed by the processor 22; the value of hardware registers in the processor 22; and interrupts received by the processor 22.

Still referring to FIG. 2, in some embodiments the integrated circuit SOC 20 may further comprise an event trigger system 34. The event trigger system 34 couples to the data flattener circuit 32 and receives a least a portion of the serialized data. In response to various pre-programmed triggers (where such triggers may be communicated to the event trigger system 34 by way of JTAG-based communications), the event trigger system 34 asserts a trigger signal 36 to the trace system 28. In response, the trace system 28 accumulates trace data in the FIFO buffer 30 and sends the trace data to the host computer 12 (FIG. 1).

Referring simultaneously to FIGS. 1 and 2, a user of the host computer 12 wishing to debug a software program executable on the target system 10 enables the event trigger system 34, possibly by JTAG-based communication over the serial cable 18. Thereafter, the user initiates the target program on the target system 10. The processor 22 executes the target program, while the data flattener circuit 32 gathers pertinent information, serializes the information, and forwards it both to the event trigger system 34 and the trace system 28. At points in time before the trace system 28 is enabled by the event trigger system 34, the data supplied to the trace system 28 by the data flattener circuit 32 may be ignored, discarded or collected such that the trace data comprises events just prior to the trigger. At a point in execution of the target or traced program, the trigger events occur and the trigger events are identified by the event trigger system 34. The event trigger system 34 asserts the trigger signal 36 to the trace system 28.

In response to assertion of the trigger signal 36, the trace system 28 collects the trace data in the FIFO buffer 30 (possibly together with events that occur prior to the trigger). Simultaneously with collecting, the trace system 28 sends the trace data to the host computer 12. In embodiments where all or substantially all the events after the assertion of the trigger signal 36 are part of the trace data, the trace system 28 sends the trace data over the relatively high bandwidth multi-pin cable 16. In alternative embodiments where the trace system 28 statistically samples the events, the trace system 28 sends the information over the JTAG-based serial communication cable 18. In yet still other embodiments, sending of the trace data from the target system 10 to the host computer 12 may be accomplished by sending data over both the JTAG-based communication and the relatively high bandwidth communication across multi-pin connector 16. Other embodiments comprise sending the data over optical interconnect to the host computer, or logging the captured trace data in memory or disk that is accessible by the target processor where it can be accessed by another program running on the target processor (e.g., by an embedded software debugging program). Some of the illustrative trace data may be values indicative of channels upon which the processor 22 of the target system 10 is operating. Still other illustrative trace data may be values indicative of the identity of overlay programs executed by the processor 22 of the target system 10, which requires a brief digression into the relationship between overlay regions in the fast memory 24 and overlay programs.

FIG. 3 conceptually shows the relationship between overlay regions and overlay programs. In particular, FIG. 3 shows a portion of the fast memory 24 (also FIG. 2), which could be on the same silicon die as the processor 22 (FIG. 2). The fast memory 24 in this illustrative case has two overlay regions, overlay region A 42 and overlay region B 44. FIG. 3 further shows a portion of a memory subsystem 21 (also FIG. 1) which has stored therein various overlay programs. In particular, overlay programs 48A through 48C are overlays for overlay region 42. Likewise, overlay programs 50A through 50C are overlays for overlay region 44. In the memory subsystem 21, the overlays are stored at different addresses than where placed in the fast memory 24 for execution. While only three overlays are shown for each overlay region, any number of overlay regions and any number of overlay programs may be equivalently used.

Consider for purposes of explanation that each of the overlays 48 and 50 are executable programs. Before execution, an overlay manager copies each overlay to its respective overlay region. For example, an overlay manager copies overlay 48A to the overlay region 42, and the processor begins execution of the overlay at the starting address 52. At some other point in time, possibly while the processor executes programs in the overlay region 44, the overlay manager copies the overlay 48B to the overlay region 42, and the processor begins execution again at the starting address 52. Thus, from a trace data perspective where the trace data contains the addresses of the executed instructions (and where the debug-trace program externally correlates object code versions of the programs to the executed addresses), there is no easily discernable difference between the multiple overlays as they are executed from the same addresses.

Now consider that the overlays 48 and 50 are data sets. Before the processor accesses data from the data sets, the overlay manager copies each overlay to is respective overlay region. For example, an overlay manager copies overlay 48A to the overlay region 42, and the processor begins accessing the data in the data set from the overlay at the starting address 52. At some other point in time, possibly while the processor accesses data from the overlay region 44, the overlay manager copies the overlay 48B to the overlay region 42, and the processor begins accessing the data set again at the starting address 52. From a trace perspective, where the trace data contains the address of the accessed data (and where the debug-trace program correlates based on other files), there is no easily discernable difference between the multiple overlays as they are accessed.

In order to assist the user of the debug-trace program 13 (executed on the host computer 12 or as an embedded debugger) in parsing the trace data, in some embodiments of the invention the trace system 28 is configured to insert into the trace data additional identifying information such as values indicative of the identity of the overlays or values indicative of the channel upon which the processor of the target system 10 is operating, among others. The debug-trace program 13 extracts the additional identifying information, which enables the debug-trace program 13 to identify, for example, which overlay programs were executed.

Referring again to FIG. 2, the trace system 28 obtains the additional identifying information (such as the values indicative of the identity of the overlay programs) from a target state register (TSR). In some embodiments the target state register is a hardware register located within the processor 22, such as target state register 38. Although the hardware register version of the target state register 38 is shown to couple to the trace system 28 (by way of a dashed line), it will be understood that the value of the target state register 38 may, in some embodiments, be supplied to the trace system after passing through the data flattener 32. A hardware register in the processor 22 may be equivalently referred to as an instruction addressable register. In alternative embodiments, the target state register may be addressable at a predefined portion of the memory subsystem address space of the target system 10, and thus may be referred to as a memory mapped target state register 23 (FIG. 1). In the illustrative system of FIG. 1, the SOC 20 couples to the memory subsystem 21 consisting of address decoders and various hardware data storage and retrieval elements such as SRAM, ROM, registers, DRAM, peripherals, and other devices that are enabled by the address decoders in response to requests to read from or write to a range of addresses in the processor address space. It is within the memory subsystem 21 that the memory mapped target state register 23 may reside. In yet still other embodiments, part or all of the memory subsystem 21 may be a part of the integrated circuit forming the SOC 20. Regardless of the precise physical location of the memory mapped target state register 23, the value placed in the memory location being the target state register 23, 38 may be addressed and read by the trace system 28 by way of a memory reference.

The trace system 28 is configured to send the value in the target state register 23, 38 to the host computer 12 only when the value in the target state register 23, 38, or a portion thereof, is newly written. Once the target state register has been written, it becomes the highest priority data item for the trace system 28 to capture, preempting other types of data until it has been read by the trace system 28. Preempting is done to ensure that the state information (e.g., overlay information) is stored earlier in the captured trace data than the traced values that rely on this information for disambiguation (e.g., program counter values). If the trace stream is disabled for a period of time (e.g., while waiting for a trigger to occur or while waiting for the debugging system to initiate a read of the information), attributing higher priority to the values in the target state register 23, 38 ensures that the last value written into the target state register 23, 38 will be presented first in the trace stream once trace data capture is again active. In embodiments where the trace system 28 couples to the host computer 12 by way of the relatively high bandwidth connection, the trace system 28 is configured to monitor the value in the target state register 23, 38 and send the value to the host computer system 12 in a message wrapping protocol that identifies to the host computer 12 that the information is the value of the target state register 23, 38. Thus, in these embodiments the values in the target state register 23, 38 are sent across the high bandwidth cable 16 along with other trace data (e.g., direct memory access (DMA) trace data, fast memory trace data, addresses of instructions executed by the processor 22 (the program counter values), the value of hardware registers in the processor 22, and interrupts received by the processor 22).

In accordance with at least some embodiments of the invention, when the overlay manager writes an overlay program 48, 50 to its respective overlay region 42, 44, the overlay manager also writes a value to the target state register 23, 38 that is indicative of the identity of the overlay program 48, 50. In embodiments where only a single overlay region (or channel or other variable, for example) exists, and where the number of possible overlays (or other variables) is relatively low, the value indicative of the identity of the overlay (or the value indicative of the channel upon which the processor of the target system 10 is operating, or a value indicative of some other variable) is written to the target state register 23, 38 in any predetermined fashion. The newly written target state register value is then sent to the host computer 12 for use by the debug-trace program 13. In situations where there are two or more of a given variable such as overlays or channels (yet where their number is still relatively low), the various portions of the target state register 23, 38 may be divided into sections, one section each applicable to each variable of a group of variables (such as to each overlay of a group of two or more overlays).

FIG. 4 shows, at the bit level, a target state register 23, 38 in accordance with some embodiments of the invention. In particular, in order to differentiate values indicative of the identity of a given variable such as overlays or channels, the bits of the target state register 23, 38 may be logically divided, each grouping of bits applicable to a singular variable element such as an overlay or a channel. For example, the grouping 56 (bits 2 through 10) may be applicable to a first overlay 44. Values written to grouping 56 are thus indicative of the identity of the first overlay 44. With grouping 56 having nine bits, the grouping 56 may be used to identify $2^9$ possible overlays. Likewise, grouping 58 (bits 11 through 16) may be applicable to a second overlay 42. Values written to grouping 58 are thus indicative of the identity of the second overlay 42. With grouping 58 having six bits, the grouping 58 may be used to identify $2^6$ possible overlays. Although FIG. 4 shows the target state register 23, 38 having two groupings, any number of groupings may be used, limited only by the number of bits in the target state register 23, 38 and the number of possible overlays, channels, or other variable in each grouping.

In alternative embodiments, the target state register 23, 38 of FIG. 4 comprises an active bit map 55 wherein individual bits of the target state register 23, 38 each correspond to a singular variable (e.g., an overlay). Specifically, the active bit map 55 comprises bits 2 through 19 (corresponding to overlays 2 through 19) and thus may identify 18 distinct overlays. While there is a one-to-one correspondence between a bit and an overlay in the active bit map 55, more than one overlay (and thus more than one bit) may correspond to an individual overlay region (FIG. 3, as discussed above). For example, a grouping 57 (bits 17 and 18) may correspond to the overlay region A 42 (FIG. 3), the grouping 56 (bits 2 through 10) may correspond to the overlay region B 44 (FIG. 3), the grouping 58 (bits 11 through 16) may correspond to an overlay region C (not shown), and bit 19 may correspond to an overlay region D (not shown). While more than 18 overlays may be available in the memory subsystem 21 (FIG. 3), overlays that are not of interest to the target program (e.g., overlays not executed within a particular subroutine) are not included in the active bit map 55. In like manner, for the case when there are fewer than 18 overlays of interest, the active bit map 55 will comprise fewer than 18 bit locations.

The active bit map 55 comprises bit locations that are asserted (e.g., logic "1") for those bits corresponding to overlays that are loaded into overlay regions within the fast memory 24 and are thus available to the processor 22 during execution of the target program (or during the execution of a particular subroutine within the target program). In like manner, bit locations corresponding to overlays that have not been loaded into the fast memory 24 (and are thus not available to the processor 22 during execution of the target program or during execution of a particular subroutine) may be de-asserted (e.g., logic "0"). While more than one overlay may correspond to a particular overlay region (e.g., grouping 56, 57, and 58), only one overlay may be loaded into a given overlay region during a particular time (as discussed above). Therefore, no more than one bit location for a particular grouping may be asserted during the execution of the target program.

The assertion and de-assertion of bit locations within the active bit map 55 (e.g., corresponding to the loading and unloading of overlays into overlay regions of the fast memory 24) is managed by a relationship table (e.g., an overlay relationship table) that defines an install and an uninstall word for each variable (e.g., each overlay) included in the active bit map 55. Loading a new overlay comprises combining the active bit map 55 in sequence with the uninstall word (via a logical AND operation) and the install word (via a logical OR operation). For example, loading overlay 18 (bit location 18 of grouping 57) would comprise combining the active bit map 55 (wherein the active bit map 55 comprises 18 don't care entries: xxxxxxxxxxxxxxxxxx) with the uninstall word for overlay 18 as defined by the overlay relationship table (110111111111111111) via a logical AND operation. The logical AND operation is meant to de-assert the bits (e.g., bit location 17) that correspond to overlays within the grouping (e.g., grouping 57) that should be unloaded (e.g., overlay 17) prior to the loading of a new overlay (e.g., overlay 18). Following the logical AND operation, the active bit map 55 (xx0xxxxxxxxxxxxxxx) would be combined with the install word for overlay 18 as defined by the overlay relationship table (010000000000000000) via a logical OR operation, resulting in the active bit map 55 (x10xxxxxxxxxxxxxxx). Thus, the logical OR operation is meant to assert the bits (e.g., bit location 18) that correspond to the overlay (e.g., overlay 18) within the grouping (e.g., grouping 57) that is to be loaded into the overlay region within the fast memory 24 that was previously cleared (of any other loaded overlay; e.g., overlay 17) during the logical AND operation. The newly written target state register value 23, 38 (comprising the active bit map 55) is then sent to the host computer 12 for use by the debug-trace program 13. In alternative embodiments, other variables, for example channels, may be identified by the debug-trace program 13 by use of a similar relationship table and bit map. In still other alternative embodiments, the debug-trace program 13 clears the contents of the active bit map 55 (i.e., target state register 23, 28) or the relationship table in advance of additional writing to these locations. When the number of variables such as overlays or channels becomes large, alternative methods are used.

As an illustrative example, in order to address situations where there are a large number of overlay regions or overlay programs, and in accordance with some embodiments, an overlay manager program writes an indication of the identity of the overlay to a log buffer. A log buffer may be equivalently referred to as a data table, data array and/or data structure. In some embodiments, data from the log buffer is read out by the debug-trace program 13 after execution of the target or traced program has stopped. In situations where the log buffer does not contain a sufficient number of storage locations to store all the log data written during a trace period (e.g., log buffer has too few locations, or the log buffer is circular and the number of entries expected will overwrite earlier entries during the trace period), the log buffer may be read and cleared by the debug-trace program 13 one or more times during the trace period to ensure all the entries generated are available.

In some embodiments, the trace system 28, in addition to the FIFO buffer 30, implements a series of memory locations 31 (FIG. 2) to be the log buffer. In alternative embodiments, the log buffer is located in RAM, either on the SOC 20 or in the memory subsystem 21 (FIG. 1). Regardless of the precise location of the log buffer, the host computer 12 has access to the log buffer and can read data from the log buffer as described above.

The logical construction of the log buffer may take many forms. In some embodiments, the log buffer is implemented as a plurality of equivalently sized data fields. In alternative embodiments, the log buffer is implemented as a plurality of arbitrary sized data fields. In yet still other embodiments, the log buffer is a table having a plurality of rows and columns. Regardless of the logical construction of the log buffer, in accordance with embodiments of the invention each entry in the log buffer comprises an indication of the variable such as the identity of the overlay and an index value. The index value is an index into the log buffer that identifies the location of the entry in the log buffer. The index value could be, for example, a pointer, packet number, sequence number, row number or any other value indicative of the location of the entry. In some embodiments, the index value is an inherent part of the entry, and in other embodiments the index value is generated and written by, for example, the overlay manager.

Again considering the illustrative example of overlays, in addition to writing the indication of the identity of the overlay and possibly the index value in the log buffer, the overlay manager in accordance with embodiments of the invention also places the index value in the trace data by writing the index value into the target state register 23, 38. Writing the index value into the target state register 23, 38 contemporaneously with writing the log buffer ensures that the index value is present in the trace data associated with the traced program. In accordance with some embodiments, the debug-trace program 13 reads the index value from the trace data, indexes into the log buffer data based on the index value, and thus obtains sufficient information to identify the overlay such that the debug-trace program can then correlate the object data to the executed addresses in the trace data. In cases where the log buffer can be read while the processor 22 is running, the log buffer can be periodically read and emptied so that the log buffer size does not limit the amount of information that can be captured. In other exemplary embodiments, writing of entries into the log buffer can be suspended for a duration of time during the execution of other instructions.

The embodiments discussed to this point utilize trace data gathered by the trace system 28 and transferred over one or both of serial cable 18 or the multi-pin cable 16; however, in alternative embodiments the SOC 20 either does not have the ability to gather all the pertinent trace data (e.g., a low cost SOC 20 that does not have the trace system 28, data flattener 32 and event trigger system 34), or the user of the debug-trace program 13 is interested in a smaller subset of the data (possibly in close to real time). Referring again to FIG. 2, in accordance with alternative embodiments the SOC 20 comprises a statistical sample system 80 which enables the alternative embodiments to utilize a method termed herein "statistical profiling."

When statistical profiling, the statistical sample system 80 is configured to periodically read the value of the program counter (which contains the address of the next instruction to execute) from the program counter register 39 and send the value of the program counter to the host computer 12. However, addresses alone may be insufficient to identify to which variable (such as which overlay or channel) the address of the program counter represents. In order to address this concern, the alternative embodiments send the value in the target state register 23, 38 in place of the value of the program counter when the value (or a portion thereof) in the target state register 23, 38 is newly written.

FIG. 2 illustrates that the statistical sample system 80 comprises a multiplexer 82 and a parallel to serial converter 84. The statistical sample system 80 periodically reads a predetermined read address, in these embodiments the output signals of the multiplexer 82. The reading may be by a direct memory access (DMA) engine within the statistical sample system 80, or the DMA engine may be at some other location on the SOC 20. The value from the predetermined read address is provided to the parallel to serial converter 84, and from there is sent to the host computer 12 (e.g., over the serial cable 18).

In some embodiments the statistical sample system 80 may be "programmed" by the host computer 12 to periodically read the predetermined read address, and thus the host computer 12 from that point forward receives the read values without further commands. In alternative embodiments, the host computer 12 may make a request (or read) for each read value. In some exemplary embodiments, these functions may be implemented by a control logic 90 and a scan system 92 coupled within the statistical sample system 80 (the coupling within the statistical sample system 80 is not shown) or coupled external to the statistical sample system 80 (FIG. 2) but still coupled within the SOC 20. The scan system 92 may comprise a JTAG scan system, and it is the control logic 90 that may be "programmed" by the host computer 12 to selectively assert or de-assert a signal 96 to the scan system 92. Depending on the value of the signal 96 received from the control logic 90, the scan system 92 (which is configured to also receive the output of the parallel to serial converter 84) may send the output of the parallel to serial converter 84 to the host computer 12 either continuously without further commands or only when requested by the host computer 12.

With regard to the value in the target state register 23, 38, the multiplexer 82 of the statistical sample system 80 is configured to provide to the predetermined read address the value of the program counter register 39, unless the value of the target state register 23, 38 (or portion thereof) has changed since the last send of the value of the target state register. If the target state register 23, 38 has been written since the last send of the value of the target state register 23, 38 (e.g., the overlay manager program writes the value of an overlay or function within an overlay), then the multiplexer select signal 86 is asserted. On the next read of the predetermined read address, the value of the target state register is present at the output of the multiplexer 82, and thus the host computer 12 is supplied the value of the target state register 23, 38. After the read, but before the next read of the predetermined read address, the statistical sample system 80 de-asserts the select signal 86.

In alternative embodiments, the operation of the target state register 23, 38 may be prescribed in part by the converse of the multiplexer select signal 86 as indicated by an inverter 99 and a dashed line in FIG. 2. As shown, the multiplexer select signal 86 is received by the multiplexer 82 while the inverse of the multiplexer select signal 86 is contemporaneously received by the target state register 23, 38 by way of the inverter 99. It will be understood that the inverter 99 is configured so that any delays associated with the propagation of the multiplexer select signal 86 through the inverter 99 will not interfere with the operation of the embodiment as described. Taking the illustrative case of identifying an overlay, values indicative of the identity of the overlay are written to the target state register 23, 38 when changes are made to the overlay regions. In the time before the target state register 23, 38 is written, and during the writing itself, the multiplexer select signal 86 is de-asserted such that the program counter values are available at the predetermined read address. During this time, the target state register 23, 38 receives values indicative of the identity of the overlay or alternative messages comprising any number of words. When the target state register 23, 38 has received a complete message, as indicated by any predetermined fashion, the multiplexer select signal 86 is asserted such that the values in the target state register 23, 38 are available at the output of the multiplexer 82 on the next read of the predetermined read address and thus the host computer 12 is supplied the value of the target state register 23, 38. After the read, but before the next read of the predetermined read address, the multiplexer select signal 86 is de-asserted and thus the program counter values are again available at the predetermined read address. Assertion and de-assertion of the multiplexer select signal 86 is configured to provide control of the output of the multiplexer based on the priority of the messages in the target state register 23, 28 as compared to the priority of the program counter values. For example, higher priority messages comprising values indicative of the identity of the overlay may be available to the host computer 12 at the output of the multiplexer 82 at a point in time earlier than lower priority program counter values.

Differentiating the program counter value from the value of the target state register 23, 38 in the host computer 12 takes advantage of the fact that in accordance with at least some embodiments the target system 10 operates based on 16 bit (two byte) instructions aligned on even byte boundaries. Thus, the value of the program counter in accordance with these embodiments consistently has an even value, meaning that the least significant bit of the program counter is zero. In order to differentiate a program counter value from a value from the target state register 23, 38, the least significant bit of the value of the target state register 23, 38 is assigned to be a logic "1". Other systems for differentiating program counter values from values of the target state register 23, 38 may be equivalently used.

In some exemplary embodiments, program execution may occur within a section of secure code (such as a proprietary algorithm) within the target program, herein referred to as "non-viewable code". Upon entry into a section of non-viewable code, the target program may send a signal from the processor 22 to the trace system 28 or to the statistical sample system 80 that indicates that program execution has entered the section of non-viewable code. In response, the trace system 28 (or the statistical sample system 80) will send the last program counter value to the debug-trace program 13 continuously without further commands. When the target program exits the section of non-viewable code, a signal may be sent from the processor 22 to the trace system 28 or to the statistical sample system 80 that indicates that program execution has exited the section of non-viewable code. In response, the trace system 28 (or the statistical sample system 80) will send the current program counter value to the debug-trace program 13.

Using the statistical sample system 80, the host computer 12 (and in particular the debug-trace program 13) may get a statistical sample of values of the program counter during execution of the traced program, and each value of the target state register 23, 38 during the executed program. From this information, the debug-trace program 13 may build a display having an indication of a proportion of an execution time of the target processor is dedicated to each overlay program (and/or function within an overlay program), to the processing performed on each channel, to the execution of non-viewable code, or to the processes associated with any other variable. Such a display may help determine which of these variables, if any, consume excessive processor time and slow overall system performance. Although not as exact as the embodiments where each executed address is captured, the embodiments performing statistical sampling still may generate and display indications.

In situations where the value indicative of the identity of each overlay program (or the value indicative of the identity of a channel, or the value indicative of any other variable) is written directly to the target state register 23, 38, these embodiments enable a substantially real time view of the proportion of the execution time the target processor 22 dedicates to each singular variable, such as to each overlay program, to each channel, or to each section of non-viewable code. In embodiments where the value in the target state register 23, 38 is an index value to a log buffer, the host computer 12 may substantially simultaneously read the log buffer (e.g., log buffer 31), and build the display. In yet still other embodiments, the host computer 12 may read the values at the predetermined read address, but not read the log buffer until after execution of the traced program has stopped, and thus the illustrative displays may be constructed after the host computer 12 has read the log buffer.

FIG. 5 illustrates a method (e.g., software) in accordance with embodiments of the invention. In particular, the process starts (block 500) and proceeds to executing a traced program on a target system 10 (block 504). Illustratively, the traced program may comprise and/or operate on a diverse set of variables such as a plurality of overlay programs, a plurality of channels of a streaming media, or variables comprising any number of alternative embodiments. Thereafter, the method comprises obtaining values indicative of the identities of the variables associated with the traced program (such as which of the plurality of overlays executed on the target system 10) (block 508). In some embodiments, obtaining the values involves extracting those values directly from the trace data sent from the target system 10 to the host computer 12. In other embodiments, the values in the trace data are index values to entries in a log buffer, which log buffer may be read contemporaneously with the execution of the traced program, or after execution has stopped. Once the log buffer has been read by the debug-trace program, the buffer can be emptied. Embodiments that allow the log buffer to be read while the traced program is executing reduce the size of the log buffer to capture a given amount of information. In yet still other embodiments, obtaining the values (for example, the values indicative of which of the plurality of overlay programs executed) involves statistically sampling a predetermined read address, where the read location provides the value of the program counter, unless the value of the target state register 23, 38 has been newly written. Regardless of the precise mechanism by which the values indicative of which of the plurality of overlays executed on the target system 10, the next illustrative step is displaying an indication of a proportion of an execution time of the target processor 22 was dedicated to each variable (such as each overlay program or channel) (block 512), and thereafter the method ends (block 516).

From the description provided herein, those skilled in the art are readily able to combine software created as described from the methods with appropriate general purpose or special purpose computer hardware to create a computer system and/or computer subcomponents embodying the invention, to create a computer system and/or computer subcomponents for carrying out the method of the invention, and/or to create a computer-readable media for storing a software program to implement the method aspects of the invention. The computer-readable medium may be, for example, a volatile memory, a non-volatile memory, a compact disc read only memory (CDROM), an electrically erasable programmable read only memory (EEPROM), a hard drive, or the like.

The above discussion is meant to be illustrative of the principles and various embodiments of the present invention. Numerous variations and modifications will become apparent to those skilled in the art once the above disclosure is fully appreciated. For example, although the discussion has assumed that the overlay manager program is responsible for writing the target state register and/or the log buffer, in alterative embodiments the overlay program itself may write the pertinent information when executed. It is intended that the following claims be interpreted to embrace all such variations and modifications.

What is claimed is:

1. An integrated circuit device comprising:
    a processing circuit configured to execute a target program, the processing circuit having a plurality of registers;
    a trace system operatively coupled to the processing circuit, the trace system configured to collect trace data comprising the values of the plurality of registers, and the trace system configured to send the trace data for use by a debug program;
    a first memory operatively coupled to the processing circuit, the first memory comprises a plurality of overlay regions;
    a memory subsystem operatively coupled to the processing circuit, the memory subsystem comprises a plurality of overlay programs, wherein the processing circuit is configured to execute overlay programs from the plurality of overlay regions; and
    a memory location operatively coupled to the trace system, the memory location writable by the target program;
    wherein the trace system is configured to send a value stored in the memory location to a host computer only when the value is newly written, the value stored in the memory location is indicative of which of the plurality of overlay programs have been executed by the processing circuit.

2. The integrated circuit device as defined in claim 1 wherein the memory location further comprises a hardware register.

3. The integrated circuit device as defined in claim 2 wherein the hardware register is one selected from the group: an instruction addressable register, or a memory mapped register.

4. The integrated circuit device as defined in claim 1 further comprising a log buffer configured to collect the trace data, wherein the trace system is configured to send entries from the log buffer to the debug program.

5. An integrated circuit device comprising:
    a processing circuit configured to execute a target program, the processing circuit having a plurality of registers;
    a trace system operatively coupled to the processing circuit, the trace system configured to collect trace data comprising the values of the plurality of registers, and the trace system configured to send the trace data for use by a debug program;
    a first memory operatively coupled to the processing circuit, the first memory comprises a plurality of overlay regions;
    a memory subsystem operatively coupled to the processing circuit, the memory subsystem comprises a plurality of overlay programs, wherein the processing circuit is configured to execute overlay programs from the plurality of overlay regions; and
    a memory location operatively coupled to the trace system, the memory location writable by the target program;
    wherein the trace system is configured to send a value stored in the memory location to a host computer only when the value is newly written, and the memory location is configured to be used as a bit map, wherein bits within the memory location are asserted to indicate which of the plurality of overlay programs have been loaded to the first memory.

6. An integrated circuit device comprising:
    a processing circuit configured to execute a target program, the processing circuit having a plurality of registers;
    a trace system operatively coupled to the processing circuit, the trace system configured to collect trace data comprising the values of the plurality of registers, and the trace system configured to send the trace data for use by a debug program;
    a first memory operatively coupled to the processing circuit, the first memory comprises a plurality of overlay regions;
    a memory subsystem operatively coupled to the processing circuit, the memory subsystem comprises a plurality of overlay programs, wherein the processing circuit is configured to execute overlay programs from the plurality of overlay regions;
    a log buffer writable by the target program and comprising values indicative of the identities of the plurality of overlay programs and index values corresponding to locations within the memory subsystem where the plurality of overlay programs are stored, and wherein a host computer reads the values from the log buffer; and
    a memory location operatively coupled to the trace system, the memory location writable by the target program;
    wherein the trace system is configured to send a value stored in the memory location to the host computer only when the value is newly written.

7. The integrated circuit device as defined in claim 1 further comprising a data flattener circuit operatively coupled to the processing circuit and the trace system, wherein the data flattener circuit is configured to serialize the trace data and send the serialized trace data to the trace system.

8. The integrated circuit device as defined in claim 7 further comprising an event trigger system operatively coupled to the data flattener circuit and the trace system, the event trigger system configured to receive a pre-programmed trigger, wherein the event trigger system is configured to assert a trigger signal to the trace system based on the pre-programmed trigger, and wherein the trace system is configured to collect the trace data based on the trigger signal.

9. An integrated circuit device comprising:
    a processing circuit configured to execute a target program, the processing circuit having a plurality of registers comprising a program counter register that stores the address of the next instruction to be executed; and
    a system operatively coupled to the processing circuit, the system configured to continually read a value from the program counter register and send an output to a host computer separate from the integrated circuit device at least one selected from the group consisting of: the value; and a preemptive value in place of the value upon notification of posting of a new preemptive value.

10. The integrated circuit device as defined in claim 9 wherein the system further comprises a multiplexer and a parallel to serial converter operatively coupled to the multiplexer, the multiplexer configured to receive a select signal, and the system configured to send the output of the parallel to serial converter to the host computer for use by a debug program.

11. The integrated circuit device as defined in claim 9 wherein a predetermined bit in a value of the program counter register is asserted to indicate the value is not the preemptive value.

12. The integrated circuit device as defined in claim 9 wherein the preemptive value is a value indicative of a non-viewable status of code within the target program.

13. The integrated circuit device as defined in claim 9 wherein a predetermined bit in the preemptive value is asserted to indicate the value is not a program counter value.

14. The integrated circuit device as defined in claim 9 further comprising a scan system configured to receive a signal from a control logic, wherein the scan system is further configured to receive an output signal from the system, and wherein the operation of the scan system is determined at least in part by the signal received from the control logic.

15. The integrated circuit device as defined in claim 10 wherein while the select signal is de-asserted, the output of the multiplexer is configured to provide a program counter value, wherein while the select signal is asserted, the output of the multiplexer is configured to provide one or more messages, one of which may be the program counter value, and wherein assertion and de-assertion of the select signal is configured to provide control of the output of the multiplexer based on a priority of the one or more messages.

16. A system comprising:
a host computer configured to execute a debug program; and
a target system electrically coupled to the host computer, wherein the target system comprises a processing circuit, a first memory operatively coupled to the processing circuit, a trace system operatively coupled to the processing circuit, and a memory location operatively coupled to the trace system;
wherein the processing circuit is configured to execute a target program and wherein the processing circuit comprises a plurality of registers;
wherein the first memory comprising instructions to be executed by the processing circuit;
wherein the trace system is configured to collect trace data comprising values of the plurality of registers, and wherein the trace system is configured to send the trace data to the host computer for use by the debug program;
wherein the memory location is writable by the target program; and
wherein the trace system is configured to send a value stored in the memory location to the host computer only when the value is newly written, the value indicative of which of a plurality or overlay programs have been executed by the processing circuit.

17. The system as defined in claim 16 wherein the target system is electrically coupled to the host computer by way of a connection selected from the group: a multi-pin connection, a serial connection, or an optical interconnection.

* * * * *

UNITED STATES PATENT AND TRADEMARK OFFICE
CERTIFICATE OF CORRECTION

PATENT NO.      : 7,603,589 B2                                                Page 1 of 1
APPLICATION NO. : 11/383370
DATED           : October 13, 2009
INVENTOR(S)     : Gary L. Swoboda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 472 days.

Signed and Sealed this

Fifth Day of October, 2010

David J. Kappos
*Director of the United States Patent and Trademark Office*